June 14, 1938.  H. W. BROWN  2,120,599
COMBINED DRAINAGE SUPPORT AND HOLDER FOR FLOWERPOTS
Filed July 3, 1937
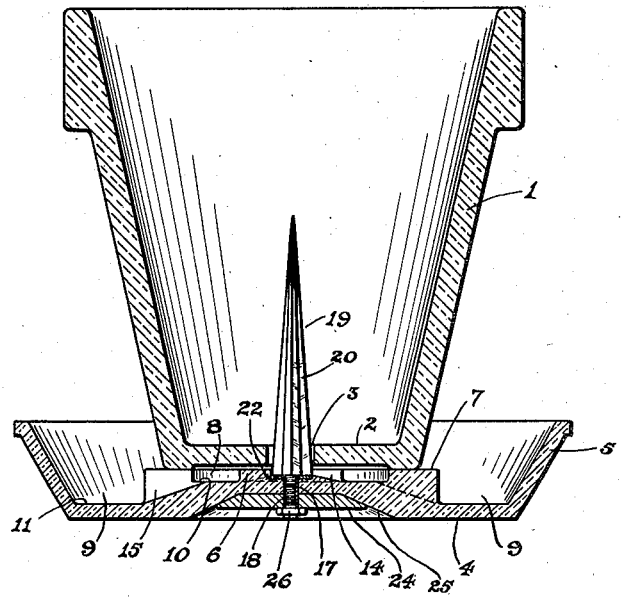
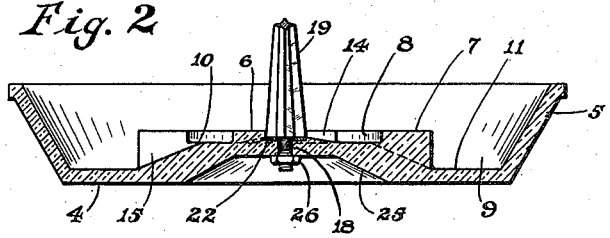
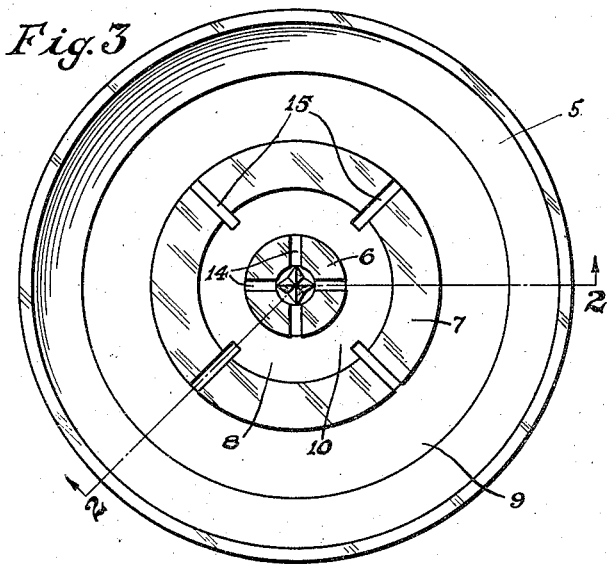
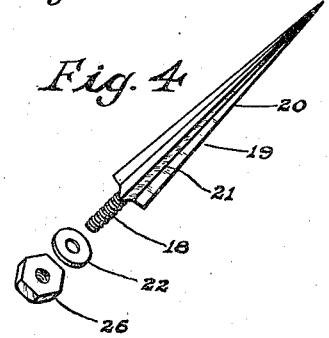
HENRY W. BROWN
INVENTOR
BY *Perley H. Clout,*
ATTORNEY Patented June 14, 1938

2,120,599

UNITED STATES PATENT OFFICE 2,120,599

COMBINED DRAINAGE SUPPORT AND HOLDER FOR FLOWERPOTS

Henry W. Brown, Providence, R. I.

Application July 3, 1937, Serial No. 151,809

5 Claims. (Cl. 47—34)

This invention relates to a combined drainage support and holder for flower pots and comprises a holder provided with means for assisting in maintaining a flower pot in upright position at all times.

One object of the invention is the provision of a device of this character provided with means for establishing drainage from the interior of a flower pot adequate to allow the complete removal of excess moisture while at the same time preventing undue desiccation of the soil within the pot at or adjacent to the base thereof by placing the interior in more or less open communication with the air.

Another object of the invention is the provision of a supporting means adapted to assist in maintaining a flower pot in upright position, effective for preventing the flower pot from becoming tilted through the weight of the foliage.

A further object of the invention is the provision of supporting means of this character so constructed that the parts are capable of separation, when desired, to permit them to be packed in a relatively small space for shipment or storage.

Another object of the invention is the provision in a device of this character of means for stabilizing flower pots containing plants having exceptionally heavy foliage and insure the maintenance of the same in upright position.

Other objects and advantages of the invention relate to various improved details of construction and novel arrangements of the parts as will be more fully set forth in the detailed description to follow.

Referring to the drawing:

Fig. 1 is a vertical sectional view through a flower pot and combined holder and support therefor, showing the arrangement of the parts in their relation to the flower pot, Fig. 2 is a similar view through a somewhat modified form of combined holder and support, Fig. 3 is a top plan view of the combined holder and support, with the flower pot removed, and showing the arrangement of the parts with relation to the base, and, Fig. 4 is a perspective view of the spindle member, washer and holding nut, showing these parts in separated relation.

In that form of the invention shown in Figs. 1, 3, and 4 of the drawing, 1 designates the flower pot which may be of any shape or design such as is commonly employed, and which comprises a base portion 2 provided with a drainage opening 3 located substantially centrally of the base.

The combined drainage holder and support comprises a relatively shallow receptacle 4 having a rim 5 extending upwardly around the edge thereof and adapted to serve as a holder for the flower pot. The receptacle 4 may be formed of earthen-ware, metal, or any other suitable form of material such as is generally used or adapted for the purpose.

The receptacle 4 is provided with a central raised portion 6, and an annular raised portion 7 spaced outwardly therefrom which is of a height substantially equal to that of the raised portion 6. An annular depression 8 is located between the central raised portion 6 and the annular raised portion 7, and a second annular depression 9 is located outwardly of the annular raised portion 7 and extends to the rim 5. The upper surface 10 of the annular depression 8 is preferably located at a somewhat higher level than the surface 11 of the annular depression 9 to permit water to flow readily from the annular depression 8 into the annular depression 9.

Several radial channels 14 are formed in the central raised portion 6, which are preferably spaced a substantially equal distance from each other, being in the present instance four in number although a greater or less number may be employed as may be found desirable. These channels may be inclined downwardly as they extend outwardly from the center through the raised portion 6 of the receptacle so that water will not be trapped therein but will flow outwardly from the center and into the annular depression 8 formed in the receptacle.

Radial channels 15 may be formed in the annular raised portion 7 and extend therethrough from the annular depression 8 to the annular depression 9. In the form of the invention as shown herein these channels 15 are four in number although a greater or less number may be employed, as may be desired, and, as shown, they are inclined downwardly somewhat from the surface of the annular depression 8 to approximately the surface of the annular depression 9, so that they will completely drain water from the annular depression 8 into the annular depression 9. In the form of the invention shown the radial channels 15 are staggered or offset from the radial channels 14 in a direction circumferentially of the annular depression 8.

An opening 17 is formed centrally of the raised portion 6 to receive the reduced threaded end 18 of a spindle 19 which projects upwardly through the opening 3 formed in the base of the flower pot, the upwardly projecting portion of the spindle is preferably of a tapered form and may be provided with a roughened surface or with radial fins 20 separated by corresponding depressions or grooves 21 in order to allow it to be readily inserted within or removed from the earth of the flower pot, as well as to provide through the grooves 21 drainage channels from the earth of the flower pot outwardly through the drainage opening 3 formed in the base thereof. A suitable washer 22, which may be formed of rubber or the like, is positioned upon the surface of the raised portion 6 and serves to prevent leakage of the drainage water through the opening 17 formed centrally of the central raised portion 6.

A stabilizing member 24 is provided which is adapted to fit substantially within a recess 25 formed upon the under face of the receptacle 4 through which the threaded end portion 18 of the spindle 19 extends, and a nut 26 is threaded upon the lower end of the reduced threaded portion 18 of the spindle to bear against the under surface of the stabilizing member 24 and hold it firmly in position against the lower surface of the tray 4 substantially centrally thereof.

In that form of the invention shown in Fig. 2 of the drawing the tray 4 and spindle member 19 are similar in all respects to those previously described except that the stabilizing member 24 is omitted and the nut 26 is threaded upwardly on the reduced threaded end 18 of the spindle 19 to bear directly against the lower surface of the tray 4.

The tray 4, like the flower pot, may be formed of any suitable or desired material, such as earthenware, metal or the like, and the stabilizing member 24 is preferably formed of lead or other heavy material to provide additional weight adjacent to the base of the tray for preventing the flower pot and tray from becoming tilted or tipped over due to the weight of the foliage or pressure against a top heavy plant. If the tray itself is formed of metal the provision of a stabilizing member becomes less important, as the weight of the tray itself will serve to prevent tilting.

The provision of a spindle member 19 of the character described serves to permit drainage from the interior of the flower pot, and at the same time holds the flower pot from tilting relative to the tray. The tapered form of the spindle facilitates its insertion into the earth contained in the flower pot and its removal therefrom, while the radial fins and alternate depression extending longitudinally of the spindle permit excess moisture to flow downwardly about the spindle and pass through the opening 3 in the base to enter the radial channels 14 which extend inwardly into communication with the drainage opening 3.

Whenever it is desired to pack the combined drainage support and holder, the spindle may be removed from the tray so that a number of trays may be nested together in a small space for storage or shipment.

What I claim is:

1. A combined drainage support and holder for flower pots comprising a shallow tray having a peripheral rim and comprising a raised portion for supporting a flower pot in inwardly spaced relation with said rim, and a spindle member carried by said tray and projecting upwardly substantially centrally thereof for insertion within the drainage opening of a flower pot to hold the flower pot against tilting movement relative to the tray and provide drainage means for draining moisture from a portion of the soil within the flower pot.

2. A combined drainage support and holder for flower pots comprising a shallow tray having a raised portion providing a support for the base of a flower pot and a depressed area located outwardly of said raised portion, said raised portion being provided with channels extending therethrough and communicating with said depressed area, a separable spindle member carried by said tray and provided with an upwardly tapered portion adapted for insertion within the drainage opening of a flower pot, and means for detachably securing said spindle member to said tray.

3. A combined drainage support and holder for flower pots comprising a tray provided with spaced raised portions for supporting a flower pot having a drainage opening, said tray having channels leading outwardly radially from the drainage opening in said flower pot, a rigid spindle member carried by the tray and adapted to project upwardly through the drainage opening in said flower pot to provide drainage means for facilitating the removal of excess moisture from the flower pot.

4. A saucer shaped tray for flower pots comprising a base portion for supporting a flower pot having an upturned rim extending therearound, a rigid spindle member firmly secured to the base and extending upwardly therefrom in position to enter a drainage opening in the flower pot and extend a substantial distance within the soil contained therein for preventing tilting of the flower pot relative to the base, and a stabilizing member carried by the base and secured to said spindle member to assist in preventing tipping of the combined flower pot and base.

5. An individual shallow tray for a flower pot having a central drainage opening, comprising a base provided with a raised peripheral rim and having a spindle member extending upwardly from a point substantially centrally of the tray and adapted to project within the drainage opening of the flower pot and to extend upwardly within the soil contained in the flower pot, said spindle member being characterized by having one or more longitudinally extending grooves formed in the surface thereof to provide drainage means from a point within the soil contained in the flower pot outwardly of the drainage opening therein.

HENRY W. BROWN.